(12) United States Patent
Kamiya et al.

(10) Patent No.: US 7,284,037 B2
(45) Date of Patent: Oct. 16, 2007

(54) SURVEY METHOD

(75) Inventors: Hiroyuki Kamiya, Fukui (JP); Yoshimi Washida, Fukui (JP)

(73) Assignee: Fukuicomputer Inc., Fukui-ken (JP)

( * ) Notice: Subject to any disclaimer, the term of this patent is extended or adjusted under 35 U.S.C. 154(b) by 787 days.

(21) Appl. No.: 10/309,107

(22) Filed: Dec. 4, 2002

(65) Prior Publication Data

US 2003/0105814 A1 Jun. 5, 2003

(30) Foreign Application Priority Data

Dec. 5, 2001 (JP) .............................. 2001-371595

(51) Int. Cl.
G06F 15/16 (2006.01)
G06F 17/30 (2006.01)
G06F 17/10 (2006.01)

(52) U.S. Cl. ........................... 709/217; 705/10; 706/45

(58) Field of Classification Search ................ 345/169, 345/25, 172; 705/10, 11; 235/375; 709/201–253; 706/45

See application file for complete search history.

(56) References Cited

U.S. PATENT DOCUMENTS

| | | | |
|---|---|---|---|
| 5,740,035 A | | 4/1998 | Cohen et al. |
| 6,151,581 A | * | 11/2000 | Kraftson et al. ................ 705/3 |
| 6,298,347 B1 | | 10/2001 | Wesley |
| 6,380,928 B1 | * | 4/2002 | Todd ........................... 345/169 |
| 6,477,504 B1 | * | 11/2002 | Hamlin et al. ................. 705/10 |

(Continued)

FOREIGN PATENT DOCUMENTS

JP  07-225778  8/1995

(Continued)

OTHER PUBLICATIONS

"Techneos Announces Sophisticated Survey Software for Handheld Computers" Techneos Systems Inc.; Press Release, May 25, 2000.

(Continued)

*Primary Examiner*—David Wiley
*Assistant Examiner*—J. Bret Dennison
(74) *Attorney, Agent, or Firm*—Westerman, Hattori, Daniels & Adrian, L.L.P.

(57) ABSTRACT

Provided is a generation and implementation system for the survey program, in which multi-faceted questions are easily generated as a survey program and distributed to portable terminals, a survey can be performed in a non-communicating state, and survey results of the survey program can be amassed at a management server without fail. A question preparation server receives an input of a question, configures an answer format for the question, generates a survey program configured to send the answers to a management server when a predetermined number of answers are inputted, and distributes the survey program to a portable terminal of a surveyor. At the time of survey, the question is displayed on the display unit of the portable terminal, an answer to the question is received via an input of the portable terminal and stored in a memory unit of the portable terminal, and a group of questions stored in the memory of unit is sent to the management server via a communication unit of the portable terminal. The management server has received the answer date analyzes the answer data, performs statistic processing, and generates visible survey report information.

6 Claims, 8 Drawing Sheets

U.S. PATENT DOCUMENTS

| | | | |
|---|---|---|---|
| 6,618,746 B2 * | 9/2003 | Desai et al. | 709/204 |
| 6,754,676 B2 * | 6/2004 | Dietz et al. | 707/104.1 |
| 6,826,540 B1 * | 11/2004 | Plantec et al. | 705/10 |
| 6,960,988 B2 * | 11/2005 | Blink et al. | 340/286.09 |
| 2002/0007303 A1 * | 1/2002 | Brookler et al. | 705/10 |
| 2003/0009372 A1 * | 1/2003 | Nyhan et al. | 705/10 |
| 2003/0042298 A1 * | 3/2003 | Allen et al. | 235/375 |
| 2003/0050939 A1 * | 3/2003 | Dietz et al. | 707/203 |
| 2003/0088452 A1 * | 5/2003 | Kelly | 705/10 |
| 2003/0200161 A1 * | 10/2003 | Bayer et al. | 705/29 |
| 2005/0071219 A1 * | 3/2005 | Kahlert et al. | 705/10 |

FOREIGN PATENT DOCUMENTS

| | | |
|---|---|---|
| JP | 09-270865 | 10/1997 |
| JP | 2000-347718 | 12/2000 |
| JP | 2001-202422 | 7/2001 |
| JP | 2001-282316 | 10/2001 |
| JP | 2001-306773 | 11/2001 |
| JP | 2001-331627 | 11/2001 |
| WO | WO99/34274 | 7/1999 |
| WO | WO99/35600 | 7/1999 |
| WO | WO 01/24078 A1 | 4/2001 |
| WO | WO 01/84433 A1 | 11/2001 |

OTHER PUBLICATIONS

Notice of Reason for Rejection mailed Jun. 12, 2007, Appl. No. 2001-371595.

* cited by examiner

FIG. 7

| DATA SENT FOR ASP CONTROL | |
|---|---|
| VARIABLE | MEANING |
| cmd | COMMAND IDENTIFIER |
| p | PROJECT CODE |

| RECEIVED DATA | |
|---|---|
| LINE | CONTENT |
| 1 | RESULT CODE |
| 2 | MESSAGE VERSION |
| 3 | SURVEY TITLE |
| 4 | NUMBER OF ANSWERS |
| 5 | NUMBER OF QUESTIONS |
| 6 | QEUSTION 1 TITLE |
| 7 | QUESTION TYPE |
| 8 | NUMBER OF CHOICES |
| 9 | CHOICE 1 TITLE |
| ... | ... |
| a | CHOICE n TITLE |
| ... | ... |
| b | QUESTION n TITLE |
| b+1 | QUESTION TYPE |
| b+2 | NUMBER OF CHOICES |
| b+3 | CHOICE 1 TITLE |
| ... | ... |
| c | CHOICE n TITLE |
| c+1 | NUMBER OF INDEXES |
| c+2 | INDEX "A" NUMBER OF CHOICES |
| c+3 | CHOICE 1 TITLE |
| ... | ... |
| d | CHOICE n TITLE |
| ... | ... |
| e | INDEX "O" NUMBER OF CHOICES |
| e+1 | CHOICE 1 TITLE |
| ... | ... |
| f | CHOICE n TITLE |
| ... | ... |
| g | INDEX "A" NUMBER OF CHOICES |
| g+1 | CHOICE 1 TITLE |
| ... | ... |
| h | CHOICE n TITLE |
| ... | ... |
| i | INDEX "O" NUMBER OF CHOICES |
| i+1 | CHOICE 1 TITLE |
| ... | ... |
| j | CHOICE n TITLE |

FIG. 8

| DATA SENT FOR ASP CONTROL | |
|---|---|
| VARIABLE | MEANING |
| cmd | COMMAND INDENTIFIER |
| p | PROJECT CODE |
| data | ANSWER DATA |

| ANSWER DATA (data) | |
|---|---|
| SEQUENCE | CONTENT |
| 1 | NUMBER OF ANSWERS |
| 2 | ANSWER ID |
| 3 | DATE |
| 4 | QUESTION 1 ANSWER NUMBER |
| ... | ... |
| a | QUESTION n ANSWER NUMBER |
| ... | ... |
| b | ANSWER ID |
| b+1 | DATE |
| b+2 | QUESTION 1 ANSWER NUMBER |
| ... | ... |
| c | QUESTION n ANSWER NUMBER |

| RESULT CODE (SEND SERVER) | |
|---|---|
| CODE | CONTENT |
| 0 | SUCCESS |
| 1 | NO PROJECT CODE |
| 2 | NO DATA |
| 2 | NO CORRESPONDING USER |
| 4 | KEY ERROR |
| 5 | QUESTION INFORMATION DOES NOT MATCH |
| 6 | DATA CONTENT ERROR |
| 7 | NUMBER OF ANSWERS DOES NOT MATCH |

SURVEY METHOD

BACKGROUND OF THE INVENTION

1. Field of the Invention

The present invention relates to a survey program for use on a portable terminal in exit polling and the like, and a method of generation the same.

2. Description of the Related Art

Up to now, the general survey method performed on the street, for example an exit poll or a traffic volume survey and the like, was that a surveyor carried survey forms and a portable counter, filled in a survey form for each surveyed person, and added up numerical values of the counter.

Then, the survey information collected, as noted above, was amassed at the survey center via a facsimile and a telephone, and inputted by an operator at the survey center with a keyboard or other such input device into a computer for tallying. After the statistical processing, the findings of the survey were reported to the news media or to a client who had requested the survey.

However, the above-mentioned survey collection method seems to be premodern, and it is quite obvious that the collection and the analyzing of the survey information at the survey center are extremely inefficient. Therefore, it has been desired to develop a technique that enables input of information electronically at the point of conducting the survey on the street, and collect and analyze the survey information automatically.

Considering these facts, applicants have proposed, in Japanese Patent Application 2001-29670, a technique that makes it possible to detect how many times each key is pushed in real time on the server side, and perform statistical processing immediately, using a portable telephone which enables it to connect to a network which connects to a server.

After the implementation of this technique, the applicants realized that it is necessary to improve this prior invention further.

Namely, since above the prior invention needed to connect the portable telephone and the server constantly, the information collection was sometimes disrupted due to communication disturbances in areas of poor electric wave condition, like the inside of a building.

Further, although the above prior invention was effective in a traffic volume survey and the like, in which a numerical value merely increased incrementally (+1), it was not suitable for a questionnaire survey which asks the age, gender, address, etc., of the surveyed person. Thus there was a desire to develop a survey system that was capable of coping with various surveys in a flexible way.

SUMMARY OF THE INVENTION

The present invention has been considered to solve the above-mentioned problems. Therefore an object thereof is to realize the generation of a survey program, and implement a system that is capable to generate various question items easily as a survey program, distribute information to portable terminals, perform the survey under a non-communicating state, and collect the survey results from the survey program at the management server without fail.

The present invention has employed the following measures for solving the above-mentioned object. That is, the survey method is to distribute the survey program generated at the question preparation server to a portable terminal, and a management server collects survey results of the survey program executed on the portable terminal.

Further, the above question preparation server receives an input of a question, sets an answer format for the question, and generates a survey configured to send the group of answers to a management server when a predetermined number of answers are inputted.

This survey program is distributed to a portable terminal that a surveyor carries. Then the portable terminal that has received the survey program displays the questions on a display unit of the portable terminal based on the survey program, receives the answer to the question via an input unit of the portable terminal, stores the answer in a memory unit of the portable terminal, and sends the group of answer stored in the memory unit to the management server via a communication unit of the portable terminal.

Furthermore, the management server that has received the group of answers analyzes it, performs statistical processing, and generates visible survey report information.

As described above, the survey program is loaded on the portable terminal, the survey results (answers) are stored in the storage device of the portable terminal, and the survey results (answers) are sent to the management server as needed. Therefore, even in a place where communication conditions are poor, it is possible to carry out the survey as long as the survey program stored in the portable terminal can run. Furthermore, since the survey program can be easily generated at the question preparation server, it is possible to prepare flexible questions based on the survey purpose. In particular, the general-purpose survey programs that require a large capacity cannot be use for each survey in case the memory capacity of the memory unit is limited as a portable terminal. Therefore, if the server can be used to generate a minimum of necessary questions, individually suitable for the survey purpose, it can be expected to process the survey program efficiently and reduce the communication time to distribute the survey program using small memory resources on the portable terminal.

BRIEF DESCRIPTION OF THE DRAWINGS

In the accompanying drawings:

FIG. 7 is a diagram of a format for question data, according to the embodiment; and FIG. 8 is a diagram of a format for answer data, according to the embodiment.

DETAILED DESCRIPTION OF THE PREFERRED EMBODIMENTS

Figure 1:
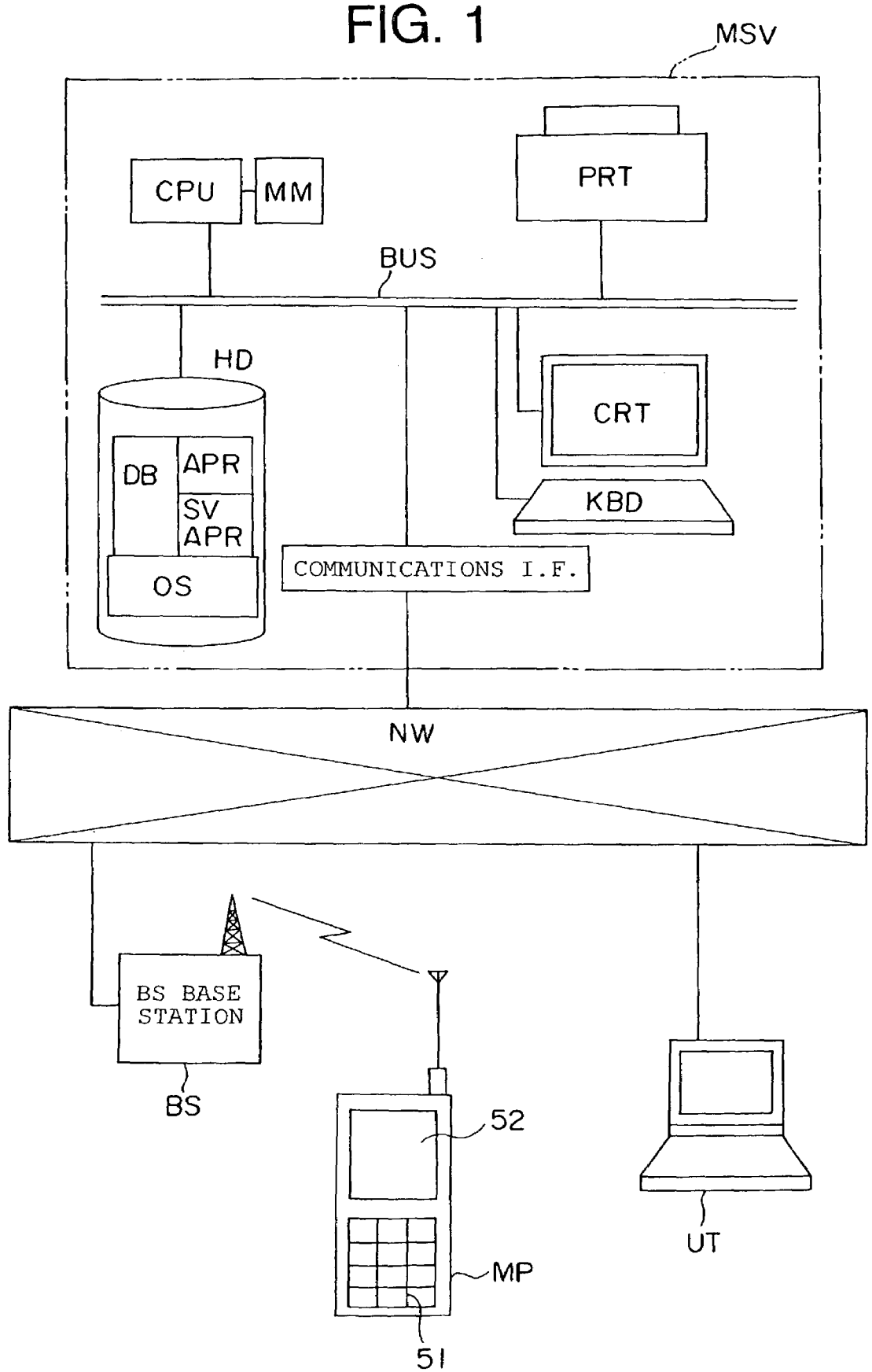
FIG. 1 is a block diagram showing a network configuration according to the present invention.

Hereinafter, an embodiment of the present invention is described, referring to the drawings.

FIG. 1 is a block diagram illustrating a network configuration of the present embodiment.

As shown in FIG. 1, with a network NW at the center, the invention of the present embodiment is composed of a management server MSV, a portable terminal MP connected via base station BS, and a user terminal UT.

Note that, the management server MSV is described as also performing a function as a question preparation server. However, the management server MSV for collecting and statistically processing the survey information, and the question preparation server may be separate.

In addition, the user terminal UT connected to the network NW is used for performing inputs at the time of preparing questions, however the user terminal UT is not necessarily indispensable, and it is also possible to use an input device KBD of the management server MSV to input the questions.

The management server MSV is managed by central processing unit CPU having a main memory MM, and this central processing unit CPU is connected to a hard disk device HD, the input device KBD, display device CRT, printing device PRT, and the like via bus BUS. Furthermore, it is connected to the network via a communication interface IF that is connected to the BUS.

An operation system OS, a server application program SVAPR, and an application program APR, are installed into the hard disk device HD. These programs are read out and executed as necessary by the central processing unit CPU via the bus BUS and the main memory MM. A question generation program described with FIG. 2 is also registered as one application program APR.

In addition to the above programs, a database DB region is constructed in the hard disk device HD. The database DB functions as an area for storing inputted question data and responses to the questions. These databases are described with FIG. 3 and FIG. 6.

Figure 2:
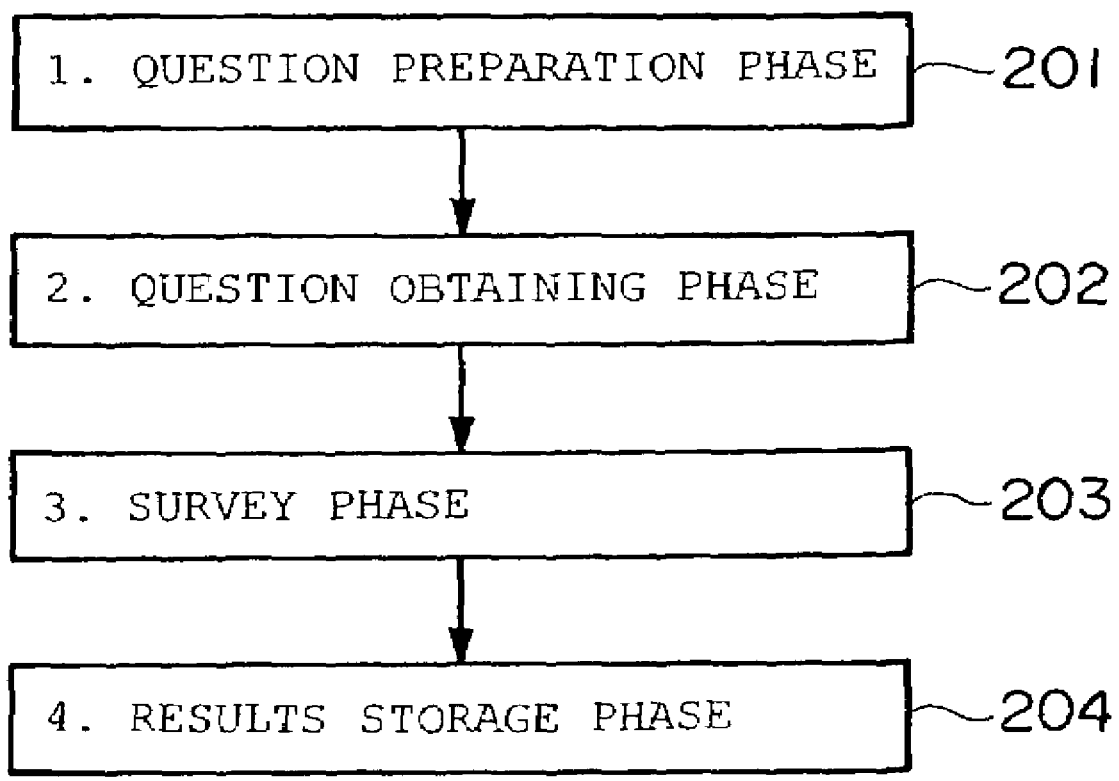
FIG. 2 is a flow chart showing a processing sequence, from question preparation to results processing, according to the present invention.
Figure 3:
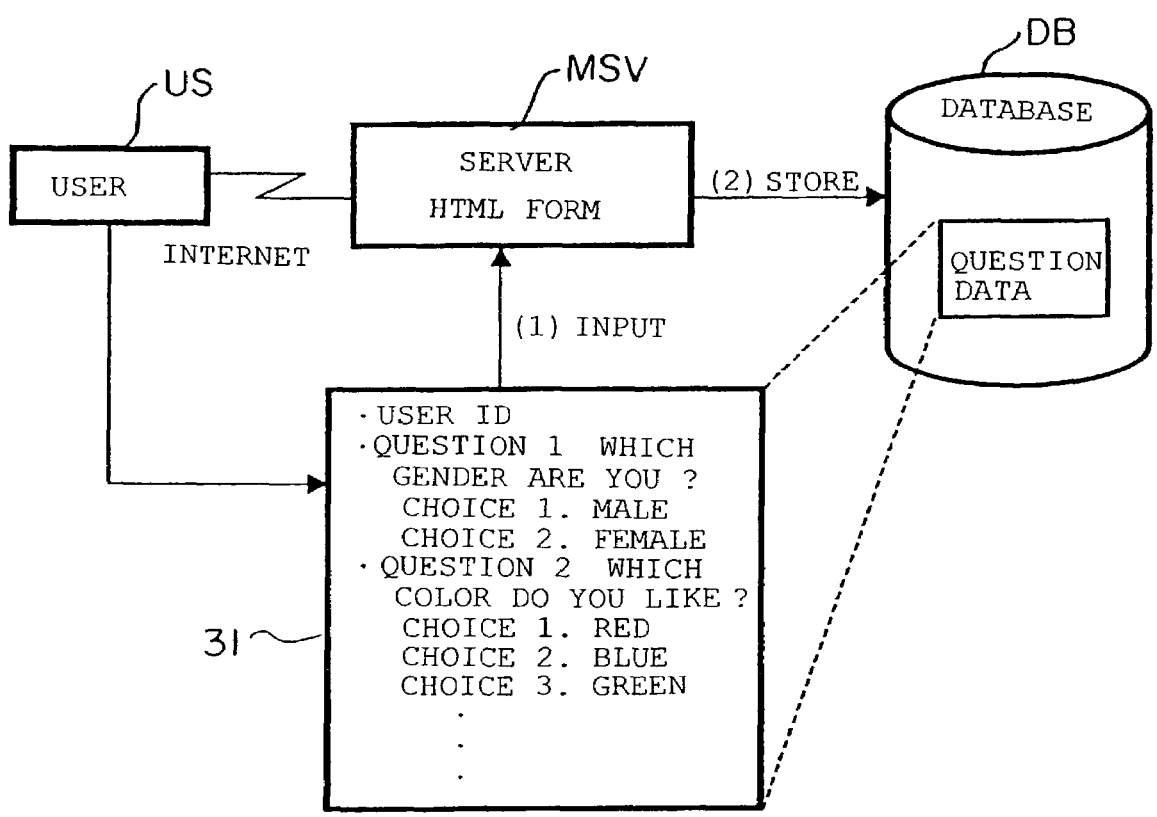
FIG. 3 is a block diagram showing a question preparation procedure according to an embodiment.
Figure 4:
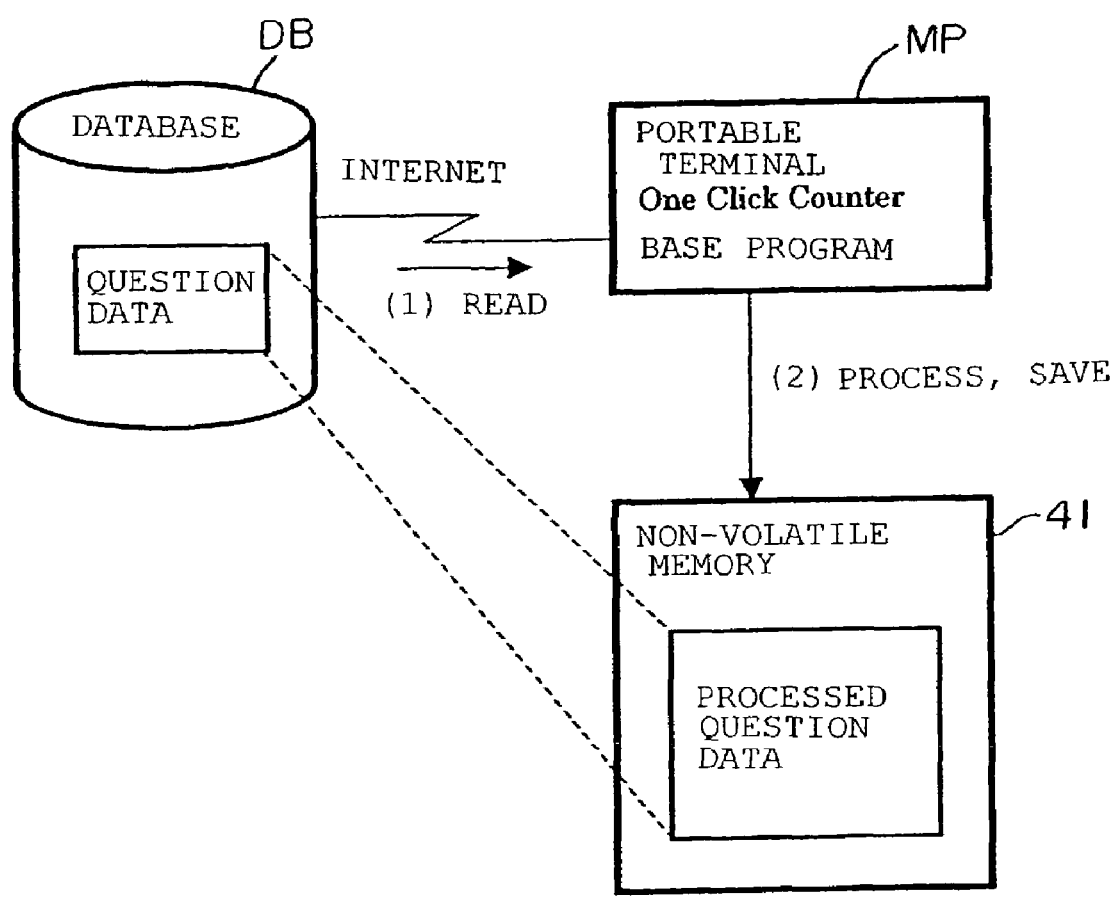
FIG. 4 is a block diagram showing a downloading procedure for a question program, according to the embodiment.

Next, FIG. 2 and FIG. 3 are used to explain the generation method for the survey program of the management server MSV.

(Next is the explanation of the generation method for the survey program of the management server MSV, using FIG. 2 and FIG. 3.)

First, the central processing unit CPU reads the question operation program out from the hard disk device HD, and executes/processes it (step 201). Specifically, using a HTML (Hyper Text Mark-up Language) as a file format, the question operation program generates display data 31 to receive questions inputted from the user terminal UT or the input device KBD. As shown in FIG. 3, the display date 31 is a display of questions regarding "gender," "favorite color," and the like, urging inputs in response thereto. That is, the questions inputted via above HTML file display and the answer formats in response thereto are registered in the database DB as JAVA applet programs capable of individual execution (step 202). FIG. 7 illustrates one example of question data included in the above question program.

When the question program is stored in the database, a communication instruction module, not shown in the diagram, is added thereto. The communications instruction module has a function of giving a command to send the answer data inputted by the execution of the question program on the portable terminal to the management server MSV. That is, the question program is configured to, display questions on the portable terminal individually as JAVA applet program, urge to input of answers to the questions, execute the communication with the management server in case the answer inputs are accumulated, and perform the process for sending the answers to the management server MSV. For example, the question program can be realized as the application called i-Apply for the i-Mode terminal by NTT Docomo, Inc.

Next, a description will be made of a sequence of processing, (step 203), formed in a case where the surveyor carries the portable terminal and performs the survey.

(Next is the explanation of the sequence of the process (step 203) in case the surveyor performs a survey, carrying the portable terminal.)

The surveyor designates an address (i.e., URL: Uniform Resource Locator) of the question program (i.e., the JAVA applet program) in the database DB from the portable terminal that the surveyor carries, and accesses the management server MSV via the base station BS and the network NW.

Next, the question program (i.e., the JAVA applet program) of the management server MSV is downloaded to a non-volatile memory 41 of the portable terminal MP.

Figure 5:
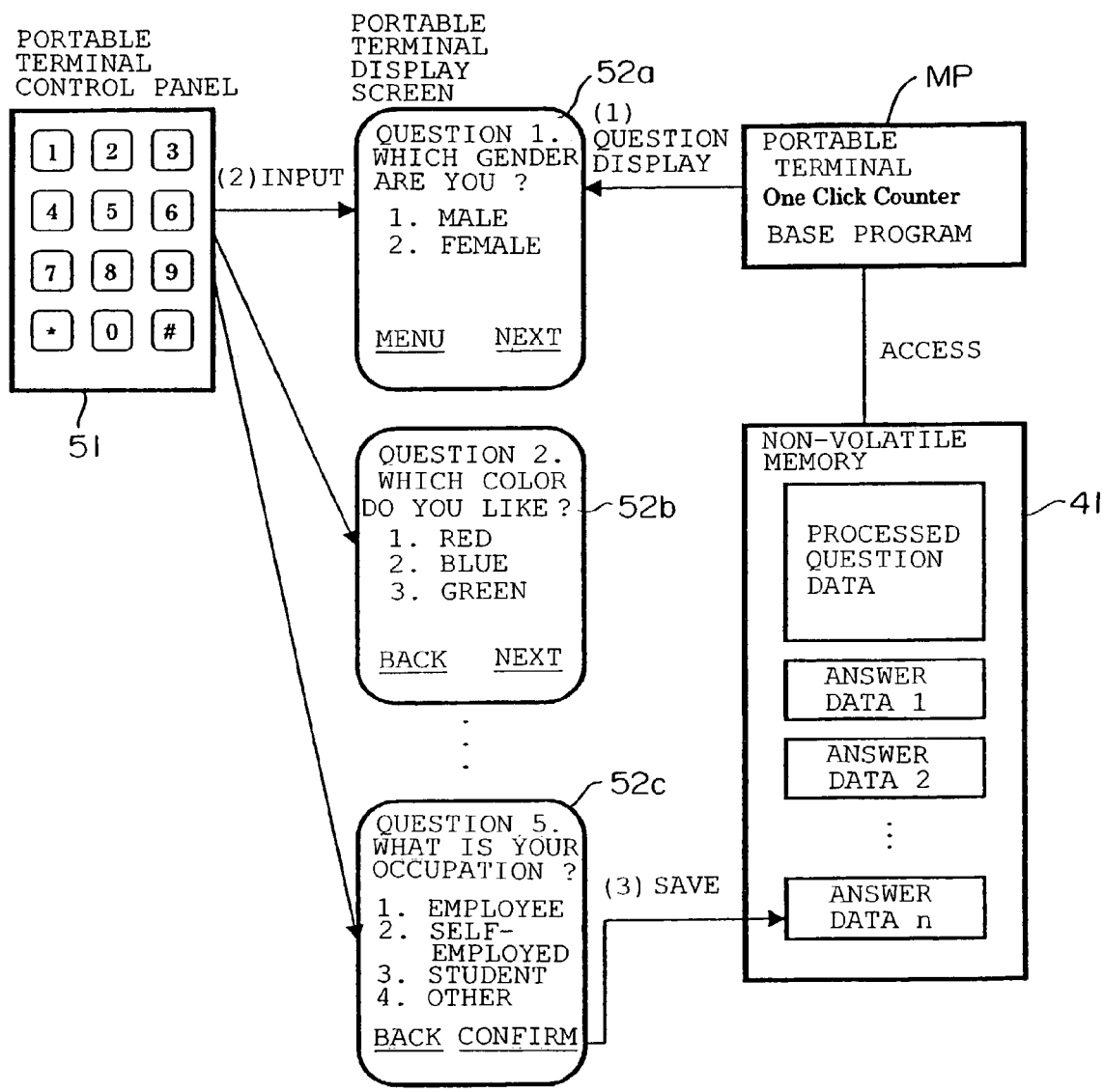
FIG. 5 is a block diagram showing a survey procedure according to the embodiment.

Then, when the surveyor starts the survey, the surveyor pushes a button 51 on the portable terminal MP to read out and execute the question program stored in the non-volatile memory 41. After that, questions are displayed in sequence on the display device 52 of the portable terminal MP as shown at symbols 52a, 52b and 52c in FIG. 5. The surveyor hands over the portable terminal to a respondent (a surveyed subject), the respondent operates the push button 51 to input one's responses while looking at the above display.

The inputted answers are stored as answer data in the non-volatile memory 41 of the portable terminal MP. As described above, it is not necessary to maintain the communication state to load the program, the question program can be executed inside a building or underground where the communication conditions are poor.

Figure 6:
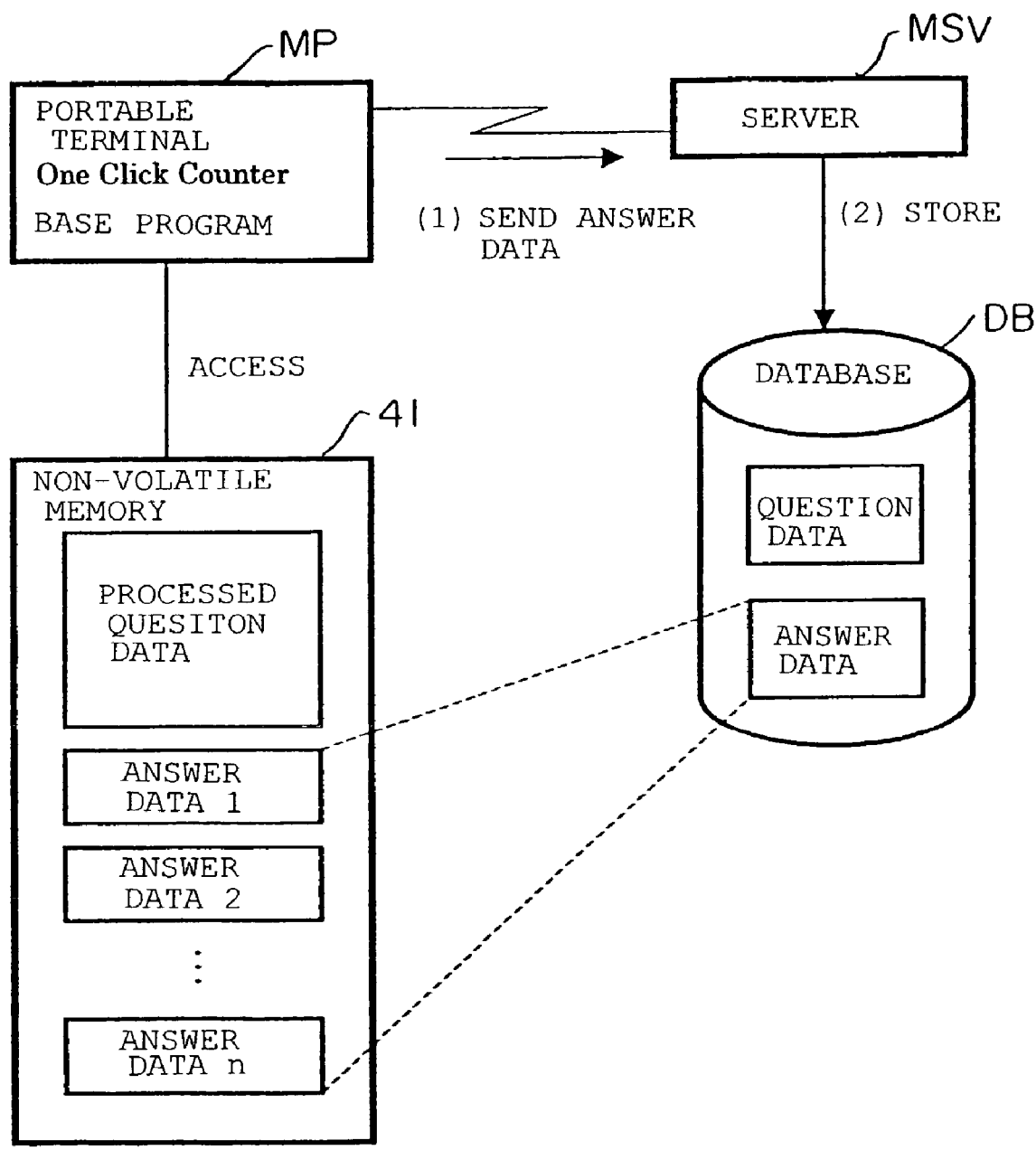
FIG. 6 is a block diagram showing a procedure of sending survey results to a management server, according to the embodiment.

Next, FIG. 6 is used to describe a procedure, (results storage phase shown in FIG. 2: step 204), for sending the accumulated answer data to the management server MSV.

(Next is the explanation of the procedure to send the accumulated answer data to the management server MSV (results storage phase shown in FIG. 2: step 204), using FIG. 6)

The question program monitors the non-volatile memory 41 and loads a communications module (not shown in the diagram) in case that it detects that the answer data accumulated in the non-volatile memory 41 has reached a predetermined amount. The communications module accesses the management server MSV, and when communication is established with the management server MSV, the answer data stored in non-volatile memory 41 is sent to the management server MSV in sequence.

The frequency of the loading of the communications module is dependent upon the capacity of the non-volatile memory 41 inside the above portable terminal MP. Namely, if the portable terminal MP has only a small memory capacity, it will very shortly reach an upper limit of the non-volatile memory 41, even with a small volume of answer data, thus the frequency of accessing the management server MSV by the communications module increases. Conversely, in case the capacity of the non-volatile memory 41 is large, the frequency of accessing the management server decreases.

In the above case, the sending of the answer data to the management server MSV occurs when the question program monitoring the non-volatile memory 41, detects that the volume thereof reaches a predetermined level, and the communications module is loaded; however, it is the only configuration. For example, a send request signal may be sent periodically from the management server MSV to the portable terminal MP, and the question program received may load the communications module and send the answer data to the management server MSV.

Further, the communication module may be loaded by manual operation of the push button 51 by the surveyor, to thereby send the answer data to the management server MSV.

Having received the answer data from the non-volatile memory 41 in the portable terminal MP, the management server MSV registers the answer data into the database DB in the hard disk device HD via the bus BUS. FIG. 8 illustrates the format of the answer data registered as discussed above.

The answer data that is stored, as discussed above, is read out by the central processing unit CPU and process, when a statistical processing program stored in the hard disk device HD is loaded. As for the results of the statistic processing, the printing device PRT prints out. Here, the statistical processing is to output the data of geographical area, gender, and the candidate that was voted for in a chart or graph format.

In addition to being printed by the printing device PRT, the statistical processing results may also be assembled as visible data such as HTML data and displayed on the user terminal UT and the like via the network NW.

Effect of the Embodiment

In accordance with the present embodiment, even in a place where communication conditions are poor, it is possible to carry out the survey as long as the survey program stored in the portable terminal can run. Furthermore, since the survey program can be easily generated at the question preparation server, it is possible to prepare flexible questions based on the survey purpose. In particular, the general-purpose survey programs that require a large capacity cannot be use for each survey in case the memory capacity of the memory unit is limited as a portable terminal. Therefore, if the server can be used to generate a minimum of necessary questions individually suitable for the survey purpose, it can be expected to process the survey program efficiently and reduce of the communication time to distribute the survey program, using small memory resources on the portable terminal.

What is claimed is:

1. A survey method comprising:
   a survey program prepared at a question preparation server is distributed to a portable terminal, and a management server collects survey programs executed on the portable terminal;
   the question preparation server receives an input of a question, sets an answer format, and generates said survey program, said survey program is configured to send a group of answers to the management server when a predetermined number of answers are inputted;
   the portable terminal that receives the survey program displays a question on a display unit of the portable terminal based on the survey program, receives the answer to the question via an input unit of the portable terminal, stores the answer in a memory unit of the portable terminal, monitors a volume of answer data stored in the memory unit of the portable terminal, issues a communication instruction in response to detecting that the volume of answer data stored in the memory unit reaches a predetermined level, and sends a group of answers stored in the memory unit to the management server via a communication unit of the portable terminal in response to the communication instruction; and
   the management server that has received the group of answers analyzes it, performs a statistical processing and generates visible survey report information.

2. A method of generating a portable terminal survey program by a question preparation server, comprising:
   receiving an input of a question via an input unit of the question preparation server;
   attaching a command to display the received question on a display unit of a portable terminal;
   configuring an answer format for the question, and attaching a command for an input unit of the portable terminal to receive an answer input conforming to the answer format;
   attaching a command to store an inputted answer into a memory unit of the portable terminal; and
   attaching a command to send answer data stored in the memory unit to a management server, via a communications unit of the portable terminal, the command to send the answer data being activated in response to monitoring a volume of answer data stored in the memory unit of the portable terminal, and detecting that the volume of answer data stored in the memory unit reaches a predetermined amount of answer data.

3. A survey method executed on a portable terminal, comprising:
   displaying a question on a display unit of the portable terminal, and urging an answer input regarding the question;
   receiving the answer via an input unit of the portable terminal;
   storing the received answer in a memory unit of the portable terminal;
   monitoring a volume of answer data stored in the memory unit of the portable terminal;
   issuing a communication instruction in response to detecting that the volume of answer data stored in the memory unit reaches a predetermined level; and
   sending a group of plural answers stored in the memory unit to a management server via a communications unit of the portable terminal in response to the communication instruction.

4. A survey method executed on a portable terminal according to claim 3, further comprising issuing the communication instruction in response to a button operation on the portable terminal by the surveyor.

5. A survey method executed on a portable terminal according to claim 3, further comprising issuing the communication instruction in response to a reception of an information collection request signal from the management server.

6. A survey method according to claim 1, wherein distributing the survey program to the portable terminal comprises:
   designating a URL of a selected survey program collected in the management server; and
   downloading the selected survey program to the portable terminal.

* * * * *